Patented Jan. 23, 1940

2,187,816

UNITED STATES PATENT OFFICE 2,187,816

SALT OF PHTHALOCYANINE SULPHONIC ACID

Erich Hartmann, Leverkusen-Wiesdorf, and Friedrich Moll, Mannheim, Germany, assignors to General Aniline Works, Inc., New York, N. Y., a corporation of Delaware No Drawing. Application June 6, 1936, Serial No. 83,954. In Germany June 14, 1935

1 Claim. (Cl. 260—314)

The present invention relates to compounds of the phthalocyanine series and to a process of producing the same.

In the U. S. Patent No. 2,099,689 there is described that the sulphonic acids of the so-called phthalocyanines can be converted into water-insoluble salts by treating the said sulphonic acids in aqueous solutions with metal compounds suitable for laking.

We have now found that salt-like compounds of the phthalocyanine series can also be obtained by reacting sulphonic acids of phthalocyanines with organic basic compounds. The salt-like compounds thus obtainable have a very high fastness to light. The organic basic compounds may either be aliphatic, aliphatic-aromatic, aromatic, hydroaromatic or heterocyclic amines or basic organic dyestuffs. In particular aliphatic amines having long hydrocarbon radicles are suitable for the reaction. Instead of the free sulphonic acids of phthalocyanines their water-soluble salts may likewise be employed.

Depending on the nature of the sulphonic acids or amines employed, products having different properties are obtained. By precipitating weakly sulphonated phthalocyanines with the organic bases, color lakes are obtained which by reason of their insoluble or difficulty soluble nature are eminently adapted for use as pigments. A precipitation in the presence of substrata and/or dispersing agents may be of advantage for this purpose. By precipitating strongly sulphonated phthalocyanines with organic bases, products are obtained which are generally speaking soluble in organic solvents, such as alcohol, butanol, ethyl glycol or cyclohexanone, and which are eminently suitable for coloring varnish lacquers and organic artificial substances.

As basic dyestuffs may be mentioned dyestuffs of a great variety of classes, as for example those of the triphenylmethane or thiazine series and azo dyestuffs provided they are basic. By selecting suitable basic dyestuffs, various shades of color of great depth may be obtained. In many cases it is also preferable to carry out the conversion of the components into color lakes in the presence of substrata used for the preparation of pigments, such as alumina or barium sulphate; the addition of dispersing agents, protective colloids or soluble artificial resins may also be advantageous in some cases.

It is of special advantage to produce the said salt-like compounds on fibres consisting of or derived from cellulose, such as cotton, viscose artificial silk, paper, card-board and wood-plup. The shades of color thus obtained are distinguished by a very good fastness to light.

The following examples will further illustrate how the said invention may be carried out in practice but the invention is not restricted to these examples. The parts are by weight.

Example 1

10 parts of the sodium salt of the sulphonic acid of the blue dyestuff obtainable by heating phthalonitrile in the presence of cuprous chloride and pyridine (prepared by sulphonating the blue dyestuff with five times its amount of 40 per cent oleum while heating for one hour at 70° C., pouring on ice, separating the sulphonic acid, neutralizing with caustic soda solution and drying) are dissolved in 2000 parts of hot water and precipitated by adding a solution of cyclohexylamine slightly acidified with acetic acid. A brilliant blue-green color lake is obtained.

Example 2

10 parts of the sodium salt of the sulphonic acid of the blue dyestuff obtainable by heating phthalonitrile in the presence of cuprous chloride and pyridine (prepared by sulphonating the blue dyestuff for twenty hours in six times its amount of 60 per cent oleum at about 25° C., heating for three hours at 60° C., pouring on to a mixture of 5 parts of ice and 1 part of common salt, filtering off the resulting sulphonic acid by suction and reacting it with caustic soda solution) are dissolved in 100 parts of hot water, acidified with acetic acid and precipitated by the addition of 5 parts of dicyclohexylamine. The dyestuff is filtered off by suction, washed with water and then dried. It colors varnish lacquers greenish blue shades of excellent fastness to light.

Example 3

10 parts of the sodium salt of the phthalocyanine sulphonic acid described in Example 2 are dissolved in 100 parts of hot water and then reacted with a slightly acidified solution of the amine mixture obtainable from fatty acids of palm kernel oil. A brilliant blue-green pigment is obtained.

Example 4

10 parts of the sodium salt of the phthalocyanine sulphonic acid described in Example 2 are dissolved in 100 parts of hot water. A solution of 3 parts of barium chloride in 50 parts of water is added and the precipitation is completed by the addition of a solution of 1 part of dodecylamine which has been dissolved in 10 parts of water with an addition of acetic acid. A color lake which is very fast to water is obtained.

*Example 5*

3 parts of the sodium salt of the sulphonic acid of the blue substance obtainable by heating phthalodinitrile in the presence of cuprous chloride and pyridine (prepared by sulphonation of the blue substance with five times the amount of 30 per cent oleum while heating for an hour at 80° C., pouring on to ice and neutralizing by the addition of sodium carbonate with subsequent salting out) are dissolved in water and there is then added a solution of 1 part of Rhodulin Blue 6G (Schultz, Farbstofftabellen, 7th edition, volume 1, No. 755) while stirring.

The precipitate obtained may be directly added to a substratum without filtration. A substratum suitable for example for printing wallpaper may be prepared for example by suspending 25 parts of heavy spar in water and adding a 10 per cent solution of 10 parts of aluminium sulphate (18 per cent of $Al_2O_3$) and then a 10 per cent solution of 4 parts of calcined sodium carbonate.

*Example 6*

3 parts of cobalt-containing sulphonated phthalocyanine dyestuff are dissolved in boiling water and added to a substratum which has been prepared by mixing 10 per cent aqueous solutions of 10 parts of aluminium sulphate, 5 parts of calcined sodium carbonate and 10 parts of crystallized barium chloride. An aqueous solution of 1 part of Methylene Blue BB (ibid, No. 1038) is then added while stirring and a deep blue color lake is obtained which may be further worked up in any desired manner.

*Example 7*

A 10 per cent solution of 30 parts of aluminium sulphate is precipitated with 12 parts of sodium carbonate and the solution is separated from the precipitate by decantation. An aqueous solution of 2.25 parts of a nickel-containing sulphonated phthalocyanine dyestuff is added to the precipitate and then a solution of 0.9 part of Rhodulin Blue 5B (ibid, volume 2, page 184) is added.

A blue color lake fast to water is obtained which after filtration may be further worked up, for example by drying and triturating with blown linseed oil varnish.

*Example 8*

An aqueous solution of 1 part of Brilliant Green extra crystallized (ibid, volume 1, No. 760) is added to a substratum which has been prepared by precipitating 10 per cent solutions of 30 parts of aluminium sulphate and 12 parts of calcined sodium carbonate, the color lake then being precipitated by the addition of a solution of 2.5 parts of a sulphonated phthalocyanine dyestuff free from metal. After filtration, the lake may either be further worked up with aqueous binding agents or dried.

*Example 9*

An aqueous solution of 3 parts of a sulphonated copper phthalocyanine and a solution of 0.2 part of auramine concentrated (ibid, volume 1, page 752) are added to a substratum according to Example 4. The precipitation is finally completed by the addition of an aqueous solution of 3 parts of barium chloride.

*Example 10*

A hot solution of 20 parts of the sodium salt of copper phthalocyanine sulphonic acid (prepared by treating copper phthalocyanine with 60 per cent oleum for 20 hours at 25° C. and for further 5 hours at 50° C.) in 400 parts of water is mixed with a solution of 8 parts of Diamond Green GX (ibid, 1931, No. 760) in 1000 parts of hot water. The compound formed is filtered off by suction, washed and dried. It colors nitrocellulose lacquers very clear bluish green shades.

By employing a solution of 14 parts of auramine G (ibid, volume 1, No. 753) in 3000 parts of hot water instead of the said dyestuff a compound is obtained which is especially suitable for coloring nitrocellulose lacquers and organic artificial masses, very clear colorations having a bluish green tint and a very good fastness to light being obtained.

*Example 11*

50 grams of cotton or viscose artificial silk are introduced into a bath containing 2 per cent (calculated on the weight of fibres) of a copper phthalocyanine sulphonic acid, 40 per cent of Glauber's salt and 2 per cent of soda. After boiling for about an hour, the fabric is rinsed and further treated in another bath containing 1 per cent of Methylene BB (ibid, No. 1038). The dyeing thus obtained has a better fastness to light than a dyeing produced with Methylene Blue BB alone in the usual manner.

*Example 12*

100 parts of copper phthalocyanine are treated for 20 hours at room temperature with 750 parts of 40 per cent oleum. The solution is then heated for two hours at 90° C., poured on to a mixture of 5000 parts of ice and 500 parts of common salt. The sodium salt of the sulphonic acid thus formed is filtered off by suction, stirred with 20,000 parts of water and the solution heated at about 80° C. is mixed with 100 parts of dodecyl dimethyl amine. The salt-like compound thus formed is washed with hot water, filtered off by suction and dried. It is a dark green powder which dissolves in nitrocellulose lacquer giving a greenish blue coloration. This solution may be employed for preparing coatings of excellent fastness to light.

*Example 13*

100 parts of zinc phthalocyanine are treated at room temperature for 20 hours with 1000 parts of 30 per cent oleum and further heated for 4 hours at about 50° C. The sulphonic acid formed is separated in form of its sodium salt by pouring the sulphonic acid solution on to 10,000 parts of ice water containing 1000 parts of common salt.

It is then mixed with 20,000 parts of water and 150 parts of dicyclohexyl amine are added at about 80° C. The dark green powder obtained after filtering off by suction and drying is soluble in many organic solvents. When dissolved in nitrocellulose lacquers or other organic masses blue-green colorations of excellent fastness to light are obtained.

What we claim is:

A compound of copper phthalocyanine trisulphonic acid and the amine mixture obtainable from the fatty acids contained in palm kernel oil the alkyl radicals of said amines corresponding with the alkyl radicals of said acids.

ERICH HARTMANN.
FRIEDRICH MOLL.